(12) United States Patent
Son et al.

(10) Patent No.: US 11,874,446 B2
(45) Date of Patent: Jan. 16, 2024

(54) OPTICAL IMAGING SYSTEM

(71) Applicant: SAMSUNG ELECTRO-MECHANICS CO., LTD., Suwon-si (KR)

(72) Inventors: Ju Hwa Son, Suwon-si (KR); Young Su Jin, Suwon-si (KR); Dong Shin Yang, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 51 days.

(21) Appl. No.: 17/209,362

(22) Filed: Mar. 23, 2021

(65) Prior Publication Data

US 2021/0208372 A1 Jul. 8, 2021

Related U.S. Application Data

(63) Continuation of application No. 16/113,350, filed on Aug. 27, 2018, now Pat. No. 10,989,901.

(30) Foreign Application Priority Data

Oct. 27, 2017 (KR) .................. 10-2017-0141370

(51) Int. Cl.
*G02B 13/00* (2006.01)
*G02B 9/62* (2006.01)
(Continued)

(52) U.S. Cl.
CPC ........... *G02B 13/0045* (2013.01); *G02B 9/62* (2013.01); *G02B 13/02* (2013.01); *H04N 23/55* (2023.01)

(58) Field of Classification Search
CPC ...... G02B 9/62; G02B 13/0045; G02B 13/22; G02B 13/02
(Continued)

(56) References Cited

U.S. PATENT DOCUMENTS 5,311,364 A * 5/1994 Kanoshima .............. G02B 9/62
359/740
9,158,091 B2 10/2015 Park et al.
(Continued)

FOREIGN PATENT DOCUMENTS

CN 104133283 A 11/2014
CN 104656229 A 5/2015
(Continued)

OTHER PUBLICATIONS

Chinese Office Action dated Nov. 11, 2020 in counterpart Chinese Patent Application No. 201811255482.X (6 pages in English, 8 pages in Chinese).
(Continued)

*Primary Examiner* — Zachary W Wilkes
(74) *Attorney, Agent, or Firm* — NSIP Law

(57) ABSTRACT

An optical imaging system includes a first lens, a second lens, a third lens, a fourth lens, a fifth lens, and a sixth lens sequentially disposed on an optical axis from an object side toward an image side. A distance from an object-side surface of the first lens to an imaging plane of an image sensor is TTL, an overall focal length of an optical system including the first to sixth lenses is F, and TTL/F≤0.83. An optical axis distance between the second lens and the third lens is D23, an optical axis distance between the third lens and the fourth lens is D34, and 2.2<D23/D34<5.4.

12 Claims, 7 Drawing Sheets

(51) Int. Cl.
  *G02B 13/02* (2006.01)
  *H04N 23/55* (2023.01)
(58) Field of Classification Search
  USPC .................................. 359/757, 713, 756, 658
  See application file for complete search history.

(56) References Cited

U.S. PATENT DOCUMENTS

| | | | |
|---|---|---|---|
| 9,235,200 | B2 | 1/2016 | Shinohara et al. |
| 9,405,099 | B2 | 8/2016 | Jo et al. |
| 9,726,857 | B2 * | 8/2017 | Chen .................. G02B 13/0045 |
| 9,726,858 | B2 | 8/2017 | Huang |
| 9,759,893 | B2 | 9/2017 | Jo |
| 9,904,036 | B1 * | 2/2018 | Chen .................. G02B 13/0045 |
| 9,977,224 | B2 * | 5/2018 | Tang .................. G02B 13/0045 |
| 10,302,911 | B2 | 5/2019 | Lee et al. |
| 10,324,272 | B2 | 6/2019 | Huang |
| 10,466,444 | B2 * | 11/2019 | Chen .................. G02B 13/0045 |
| 10,678,020 | B2 | 6/2020 | Fukaya |
| 2014/0078603 | A1 | 3/2014 | You |
| 2015/0085135 | A1 | 3/2015 | Chen et al. |
| 2015/0138431 | A1 | 5/2015 | Shin et al. |
| 2015/0146086 | A1 | 5/2015 | Liao |
| 2016/0187620 | A1 | 6/2016 | Huang |
| 2016/0187621 | A1 | 6/2016 | Chen |
| 2017/0023769 | A1 | 1/2017 | Jo |
| 2017/0108665 | A1 | 4/2017 | Huang |
| 2017/0146776 | A1 * | 5/2017 | Kang ....................... G02B 9/62 |
| 2017/0227734 | A1 | 8/2017 | Huang |
| 2017/0307849 | A1 | 10/2017 | Jhang et al. |
| 2017/0351061 | A1 | 12/2017 | Chang et al. |
| 2018/0059372 | A1 * | 3/2018 | Cheng ................ G02B 13/0045 |
| 2018/0059374 | A1 * | 3/2018 | Chen .................. G02B 13/0045 |
| 2018/0074296 | A1 * | 3/2018 | Lee ........................... G02B 9/62 |
| 2018/0074297 | A1 * | 3/2018 | Lee ........................... G02B 9/62 |
| 2018/0335549 | A1 | 11/2018 | Dai et al. |
| 2019/0086642 | A1 * | 3/2019 | Chen ....................... G02B 9/62 |

FOREIGN PATENT DOCUMENTS

| | | |
|---|---|---|
| CN | 204556941 U | 8/2015 |
| CN | 105572848 A | 5/2016 |
| CN | 205844609 U | 12/2016 |
| CN | 106371193 A | 2/2017 |
| CN | 106597634 A | 4/2017 |
| CN | 106940468 A | 7/2017 |
| CN | 107462968 A | 12/2017 |
| KR | 10-2015-0059212 A | 6/2015 |
| KR | 10-2017-0059244 A | 5/2017 |
| KR | 10-1762006 B1 | 7/2017 |
| KR | 10-2017-0106185 A | 9/2017 |
| TW | 1534497 B | 5/2016 |

OTHER PUBLICATIONS

Chinese Office Action dated Apr. 14, 2021 in counterpart Chinese Patent Application No. 201811255482.X (9 pages in English, 8 pages in Chinese).

Korean Office Action dated Jun. 29, 2021 in counterpart Korean Patent Application No. 10-2018-0132313 (5 pages in English and 4 pages in Korean).

Korean Office Action dated Nov. 16, 2021 in corresponding Korean Patent Application No. 10-2021-0102406 (8 pages in English and 6 pages in Korean).

Chinese Office Action dated Sep. 22, 2022, in counterpart Chinese Patent Application No. 202111137481.7 (4 pages in English and 6 pages in Chinese).

* cited by examiner

OPTICAL IMAGING SYSTEM

CROSS-REFERENCE TO RELATED APPLICATIONS

This application is a Continuation Application of U.S. patent application Ser. No. 16/113,350 filed on Aug. 27, 2018, now U.S. Pat. No. 10,989,901 issued on Apr. 27, 2021, which claims the benefit under 35 USC 119(a) of Korean Patent Application No. 10-2017-0141370 filed on Oct. 27, 2017, in the Korean Intellectual Property Office, the entire disclosures of which are incorporated herein by reference for all purposes.

BACKGROUND

1. Field

This application relates to an optical imaging system.

2. Description of the Background

Recently, mobile communications terminals have been provided with camera modules, enabling video calling and image capturing. As the utilization of camera modules mounted in mobile communications terminals has increased, camera modules for mobile communications terminals have gradually been required to have higher resolution and performance.

Because there is also a trend to gradually miniaturize and lighten mobile communications terminals, there may be limitations in realizing camera modules having high resolution and performance.

In addition, a telephoto lens has a relatively long focal length. Accordingly, a total length (TTL) thereof may be increased, which may make it difficult to mount such a telephoto lens in a small portable electronic device.

The above information is presented as background information only to assist with an understanding of the present disclosure. No determination has been made, and no assertion is made, as to whether any of the above might be applicable as prior art with regard to the disclosure.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, and a sixth lens sequentially disposed on an optical axis from an object side toward an image side. A distance from an object-side surface of the first lens to an imaging plane of an image sensor is TTL, an overall focal length of an optical system including the first to sixth lenses is F, and TTL/F is less than or equal to 0.83. An optical axis distance between the second lens and the third lens is D23, an optical axis distance between the third lens and the fourth lens is D34, and D23/D34 is greater than 2.2 and less than 5.4.

A field of view of the optical system including the first to sixth lenses is FOV and FOV may be less than or equal to 44°.

A focal length of the first lens is f1 and f1/F may be greater than 0.3 and less than 0.4.

An optical axis distance between the first lens and the second lens is D12 and D23/D12 may be greater than 10 and less than 22.

An optical axis distance between the fourth lens and the fifth lens is D45, an optical axis distance between the fifth lens and the sixth lens is D56, and D45/D56 may be greater than 58 and less than 65.

The first lens may have positive refractive power, and among absolute values of focal lengths of the first to sixth lenses, the absolute value of the focal length of the first lens may be the shortest.

The second lens may have negative refractive power and an image-side surface thereof may be concave.

The third lens may have negative refractive power, an object-side surface thereof may be convex, and an image-side surface thereof may be concave.

The fourth lens may have positive or negative refractive power, an object-side surface thereof may be convex, and an image-side surface thereof may be concave.

The fifth lens may have negative refractive power, an object-side surface thereof may be concave, and an image-side surface thereof may be convex.

The sixth lens may have positive refractive power, an object-side surface thereof may be concave, and an image-side surface thereof may be convex.

The first to sixth lenses may each be formed of plastic comprising optical characteristics different from an adjacent lens.

A stop may be disposed between the third lens and the fourth lens.

At least one inflection point may be formed on an object-side surface of the fourth lens.

In another general aspect, a multi-member optical imaging system includes a first optical imaging system having a first field of view and a second optical imaging system having a second field of view different from the first field of view. The first optical imaging system includes a first lens, a second lens, a third lens, a fourth lens, a fifth lens, and a sixth lens sequentially disposed on an optical axis from an object side toward an image side. A distance from an object-side surface of the first lens to an imaging plane of an image sensor is TTL, an overall focal length of the optical system including the first to sixth lenses is F, and TTL/F≤0.83.

The second lens and the third lens may be formed of plastic having optical characteristics different from each other.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
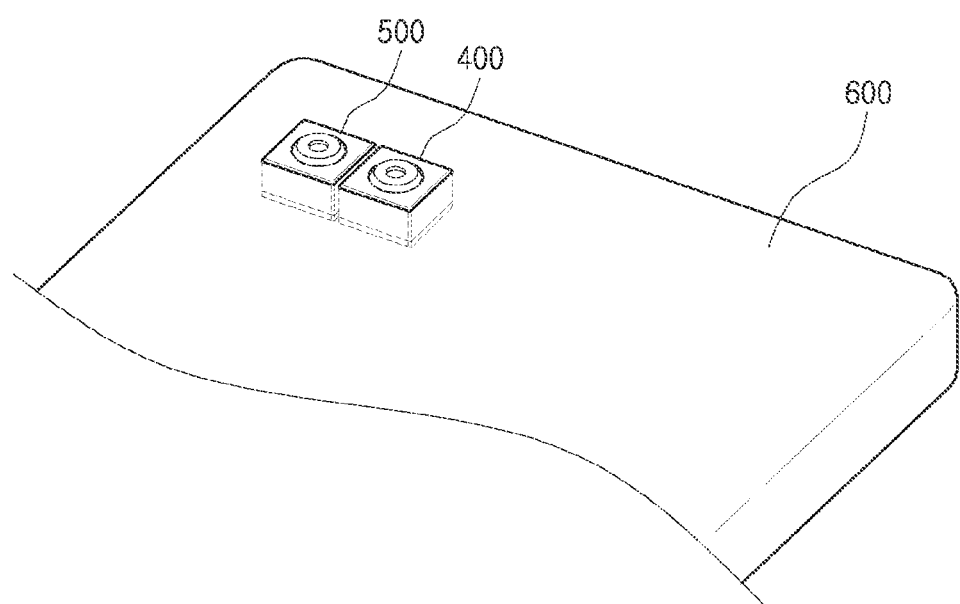
FIG. 1 is a perspective view illustrating an example of a form in which a multi-member optical imaging system in the examples described herein is mounted in a portable electronic device.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In the drawings, the thicknesses, sizes, and shapes of lenses have been slightly exaggerated for convenience of explanation. Particularly, the shapes of spherical surfaces or aspherical surfaces illustrated in the drawings are illustrated by way of example. That is, the shapes of the spherical surfaces or the aspherical surfaces are not limited to those illustrated in the drawings.

An aspect of the present disclosure may provide an optical imaging system which may be easily applied to a portable electronic device, readily perform an aberration correction, and have a narrow field of view.

Referring to FIG. 1, a multi-member optical imaging system in the examples described herein may include a plurality of optical imaging systems and each of the plurality of optical imaging systems may include a plurality of lenses.

For example, the multi-member optical imaging system in the examples disclosed herein may include a first optical imaging system 400 and a second imaging system 500.

The first optical imaging system 400 and the second optical imaging system 500 may have different fields of view. A field of view of the first optical imaging system 400 may be narrower than that of the second optical imaging system 500. As an example, the field of view of the first optical imaging system 400 may be smaller than 44°, and the field of view of the second optical imaging system 500 may be greater than that of the first optical imaging system 400.

As described above, a plurality of optical imaging systems may be designed to have different fields of view to thus capture an image of a subject at various depths and implement a zoom function.

In addition, since an image having a high level of resolution or a bright image may be generated by using (for example, synthesizing) a plurality of images for one subject, an image of the subject may be clearly captured even in a low illuminance environment.

The plurality of optical imaging systems may be mounted in a portable electronic device 600.

Examples of the first optical imaging system 400 will hereinafter be described with reference to FIGS. 2 through 7.

The first optical imaging system 400 in the examples disclosed herein may include a plurality of lenses disposed along an optical axis. The plurality of lenses may be disposed to be spaced apart from each other by preset distances along the optical axis.

As an example, the first optical imaging system 400 may include six lenses.

In the examples disclosed herein in which the optical imaging system includes six lenses, a first lens refers to a lens closest to an object, while a sixth lens refers to a lens closest to an image sensor.

In addition, a first surface of each lens refers to a surface thereof closest to an object side (or an object-side surface) and a second surface of each lens refers to a surface thereof closest to an image side (or an image-side surface). Further, in the present specification, all numerical values of radii of curvature, thicknesses, distances, and the like, of lenses are indicated by millimeters (mm), and an angle is indicated by degrees.

Further, in a description for a shape of each of the lenses, the meaning that one surface of a lens is convex is that a paraxial region portion of a corresponding surface is convex, and the meaning that one surface of a lens is concave is that a paraxial region portion of a corresponding surface is concave. Therefore, although it is described that one surface of a lens is convex, an edge portion of the lens may be concave. Likewise, although it is described that one surface of a lens is concave, an edge portion of the lens may be convex.

A paraxial region refers to a narrow region in the vicinity of an optical axis.

The first optical imaging system 400 in the examples disclosed herein may include six lenses.

For example, the first optical imaging system 400 in the examples disclosed herein may include a first lens, a second lens, a third lens, a fourth lens, a fifth lens, and a sixth lens sequentially disposed from the object side.

However, the first optical imaging system 400 in the examples disclosed herein is not limited to only including six lenses, but may further include other components.

For example, the first optical imaging system 400 may further include an image sensor configured to convert an image of a subject incident on the image sensor into an electrical signal.

In addition, the first optical imaging system 400 may further include an infrared cut-off filter configured to filter infrared light. The infrared cut-off filter may be disposed between a lens (as an example, the sixth lens) closest to the image sensor and the image sensor.

In addition, the first optical imaging system 400 may further include a stop for controlling an amount of light. For example, the stop may be disposed between the third lens and the fourth lens.

In the first optical imaging system 400 in the examples disclosed herein, all of the lenses may be formed of plastic. In addition, each lens may be formed of plastic having optical characteristics different from those of an adjacent lens.

In addition, the plurality of lenses may have at least one aspherical surface.

That is, at least one of first and second surfaces of all of the first to sixth lenses may be an aspherical surface. Here, the aspherical surfaces of the first to sixth lenses may be represented by the following Equation 1:

$$Z = \frac{cY^2}{1 + \sqrt{1 - (1+K)c^2Y^2}} + AY^4 + BY^6 + CY^8 + DY^{10} + EY^{12} + FY^{14} + GY^{16} + ... \quad (1)$$

In Equation 1, c is a curvature (an inverse of a radius of curvature) of a lens, K is a conic constant, and Y is a distance from a certain point on an aspherical surface of the lens to an optical axis in a direction perpendicular to the optical axis. In addition, constants A to G are aspherical coefficients. In addition, Z is a distance between the certain point on the aspherical surface of the lens at the distance Y and a tangential plane meeting the apex of the aspherical surface of the lens.

The first optical imaging system 400 including the first to sixth lenses may have positive refractive power/negative refractive power/negative refractive power/positive refractive power/negative refractive power/positive refractive power sequentially from the object side.

Alternatively, the first optical imaging system 400 may have positive refractive power/negative refractive power/negative refractive power/negative refractive power/negative refractive power/positive refractive power.

The first optical imaging system 400 in the examples disclosed herein may satisfy the following Conditional Expressions 2-7:

| | |
|---|---|
| TTL/F ≤ 0.83 | (2) |
| 2.2 < D23/D34 < 5.4 | (3) |
| 10 < D23/D12 < 22 | (4) |
| 58 < D45/D56 < 65 | (5) |
| 0.3 < f1/F < 0.4 | (6) |
| FOV < 44° | (7) |

In the above Conditional Expressions 2-7, TTL is a distance from an object-side surface of the first lens to an imaging plane of the image sensor, F is an overall focal length of the first optical imaging system 400, D12 is an optical axis distance between the first lens and the second lens, D23 is an optical axis distance between the second lens and the third lens, D34 is an optical axis distance between the third lens and the fourth lens, D45 is an optical axis distance between the fourth lens and the fifth lens, D56 is an optical axis distance between the fifth lens and the sixth lens, f1 is a focal length of the first lens, and FOV is a field of view of the first optical imaging system 400.

Next, the first to sixth lenses constituting the first optical imaging system 400 in the examples disclosed herein will be described.

The first lens may have positive refractive power.

In addition, both surfaces of the first lens may be convex. That is, first and second surfaces of the first lens may be convex.

At least one of the first and second surfaces of the first lens may be an aspherical surface.

For example, both surfaces of the first lens may be aspherical surfaces.

The second lens may have negative refractive power. In addition, the second lens may have a meniscus shape of which an object-side surface is convex. That is, a first surface of the second lens may be convex, and a second surface thereof may be concave. Alternatively, both surfaces of the second lens may be concave. That is, the first and second surfaces of the second lens may be concave.

At least one of the first and second surfaces of the second lens may be an aspherical surface. For example, both surfaces of the second lens may be aspherical surfaces.

In addition, the first lens and the second lens may be formed of plastic having different optical characteristics from each other. That is, the first lens may be formed of plastic having first optical characteristics and the second lens may be formed of plastic having second optical characteristics different from the first optical characteristics.

The third lens may have negative refractive power. In addition, the third lens may have a meniscus shape of which an object-side surface is convex. That is, a first surface of the third lens may be convex, and a second surface thereof may be concave.

At least one of the first and second surfaces of the third lens may be an aspherical surface. For example, both surfaces of the third lens may be aspherical surfaces.

The fourth lens may have positive or negative refractive power. In addition, the fourth lens may have a meniscus shape of which an object-side surface is convex. That is, a first surface of the fourth lens may be convex, and a second surface thereof may be concave.

At least one of the first and second surfaces of the fourth lens may be an aspherical surface. For example, both surfaces of the fourth lens may be aspherical surfaces.

In addition, at least one inflection point may be formed on the first surface of the fourth lens. For example, the first surface of the fourth lens may be convex in the paraxial region and become concave toward an edge thereof.

In addition, the third lens and the fourth lens may be formed of plastic having different optical characteristics from each other.

Further, a stop may be disposed between the third lens and the fourth lens.

The fifth lens may have negative refractive power. In addition, the fifth lens may have a meniscus shape of which an image-side surface is convex. That is, a first surface of the fifth lens may be concave, and a second surface thereof may be convex.

At least one of the first and second surfaces of the fifth lens may be an aspherical surface. For example, both surfaces of the fifth lens may be aspherical surfaces.

In addition, at least one inflection point may be formed on the first surface of the fifth lens. For example, the first surface of the fifth lens may be concave in the paraxial region and become convex toward an edge thereof.

The sixth lens may have positive refractive power. In addition, the sixth lens may have a meniscus shape of which an image-side surface is convex. That is, a first surface of the sixth lens may be concave, and a second surface thereof may be convex.

At least one of the first and second surfaces of the sixth lens may be an aspherical surface. For example, both surfaces of the sixth lens may be aspherical surfaces.

In addition, the fifth lens and the sixth lens may be formed of plastic having different optical characteristics.

In the first optical imaging system 400 configured as described above, a plurality of lenses may perform an aberration correction function to increase aberration improvement performance.

As an example, an optical axis distance between the first lens and the second lens formed of the plastic having different optical characteristics may be configured to be relatively short to improve chromatic aberration correction performance. That is, the first and second lenses may be disposed along the optical axis relatively close to each other.

In addition, an optical axis distance between the third lens and the fourth lens formed of the plastic having different optical characteristics may be configured to be relatively short, to improve chromatic aberration correction performance. That is, the third and fourth lenses may be disposed along the optical axis relatively close to each other.

In addition, an optical axis distance between the fifth lens and the sixth lens formed of the plastic having different optical characteristics may be configured to be relatively short to improve chromatic aberration correction performance. That is, the fifth and sixth lenses may be disposed along the optical axis relatively close to each other.

Meanwhile, the first optical imaging system 400 in the examples disclosed herein may have characteristics of a telephoto lens of which a field of view is less than 44°.

Figure 2:
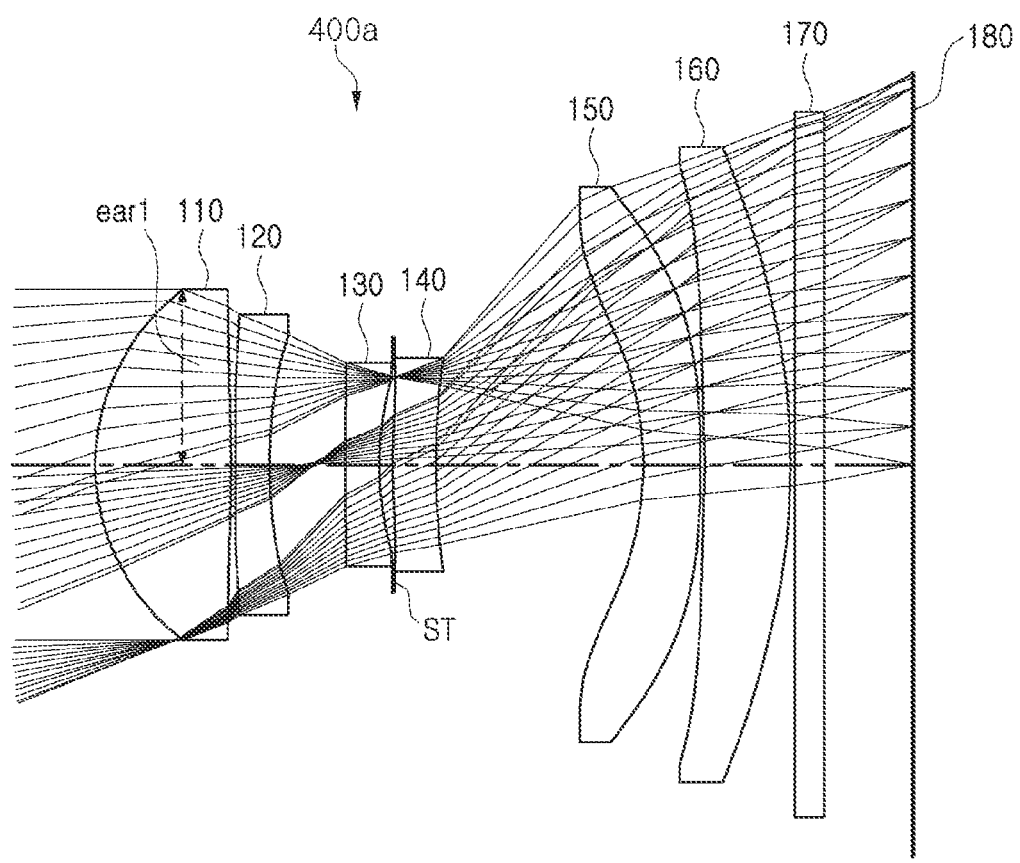
FIG. 2 is a view illustrating a first example of a first optical imaging system.

A first example of the optical imaging system 400 in the examples disclosed herein will be described with reference to FIGS. 2 and 3.

The first optical imaging system 400a in the examples disclosed herein may include an optical system including a first lens 110, a second lens 120, a third lens 130, a fourth lens 140, a fifth lens 150, and a sixth lens 160, and may further include an infrared cut-off filter 170, an image sensor 180, and a stop ST.

Here, example lens characteristics (radii of curvature, thicknesses of lenses or distances between the lenses, refractive indices, Abbe numbers, and effective aperture radii) of each lens are represented in Table 1.

Meanwhile, the effective aperture radius refers to a radius of a surface (an object-side surface or an image-side surface) of each lens through which light actually passes. As an example, referring to FIG. 1, the effective aperture radius (earl) refers to a straight line distance between an end portion at which light is incident on the object-side surface of the first lens 110 and the optical axis.

In the first example, the first lens 110 may have positive refractive power, and a first surface and a second surface thereof may be convex in a paraxial region.

The second lens 120 may have negative refractive power, and a first surface thereof may be convex in a paraxial region and a second surface thereof may be concave in the paraxial region.

An optical axis distance between the first lens 110 and the second lens 120 may be configured to be relatively short. That is, the first and second lenses 110, 120 may be disposed along the optical axis relatively close to each other.

The first lens 110 and the second lens 120 may be formed of plastic having optical characteristics different from each other. For example, the Abbe numbers of the first lens 110 and the second lens 120 may be different from each other.

The optical axis distance between the first lens 110 and the second lens 120 formed of the plastic having different optical characteristics may be configured to be relatively short to improve chromatic aberration correction performance.

The third lens 130 may have negative refractive power, and a first surface thereof may be convex in the paraxial region and a second surface thereof may be concave in the paraxial region.

The fourth lens 140 may have positive refractive power, and a first surface thereof may be convex in a paraxial region and a second surface thereof may be concave in the paraxial region.

TABLE 1

| Example 1 | Radius of Curvature | Thickness or Distance | Refractive Index | Abbe Number | Effective Aperture Radius | Focal Length |
|---|---|---|---|---|---|---|
| S1 | 1.463946731 | 0.964935043 | 1.536 | 55.650 | 1.220 | 2.416 |
| S2 | −8.646866285 | 0.025 | | | 1.097 | |
| S3 | 959.5448645 | 0.24 | 1.667 | 20.353 | 1.042 | −5.09 |
| S4 | 3.382933555 | 0.529161676 | | | 0.899 | |
| S5 | 19.42810857 | 0.24 | 1.546 | 56.114 | 0.708 | −4.382 |
| S6 | 2.120926683 | 0.098220106 | | | 0.617 | |
| S7 | 5.182858293 | 0.304685087 | 1.667 | 20.353 | 0.608 | 71.91 |
| S8 | 5.674158832 | 1.45629814 | | | 0.744 | |
| S9 | −2.264152779 | 0.4 | 1.536 | 55.650 | 1.822 | −5.153 |
| S10 | −13.32304852 | 0.025 | | | 1.928 | |
| S11 | −21.29550925 | 0.611699948 | 1.667 | 20.353 | 2.090 | 7.756 |
| S12 | −4.210032884 | 0.025 | | | 2.204 | |
| S13 | Infinity | 0.21 | 1.518 | 64.197 | 2.400 | |
| S14 | Infinity | 0.670179044 | | | 2.451 | |
| Image | Infinity | −0.05 | | | 2.725 | |

Meanwhile, in the first example, an overall focal length F of the first optical imaging system 400a is 6.927 mm, a focal length f1 of the first lens 110 is 2.416 mm, a focal length f2 of the second lens 120 is −5.09 mm, a focal length f3 of the third lens 130 is −4.382 mm, a focal length f4 of the fourth lens 140 is 71.91 mm, a focal length f5 of the fifth lens 150 is −5.153 mm, and a focal length f6 of the sixth lens 160 is 7.756 mm.

In the first example, field of view (FOV) of the first optical imaging system 400a is 43.43° and the effective aperture radius (earl) of an object-side surface of the first lens 110 is 1.22 mm.

An optical axis distance between the third lens 130 and the fourth lens 140 may be configured to be relatively short. That is, the third and fourth lenses 130, 140 may be disposed along the optical axis relatively close to each other.

The third lens 130 and the fourth lens 140 may be formed of plastic having optical characteristics different from each other. For example, the Abbe numbers of the third lens 130 and the fourth lens 140 may be different from each other.

The optical axis distance between the third lens 130 and the fourth lens 140 formed of the plastic having different optical characteristics may be configured to be relatively short to improve chromatic aberration correction performance.

In addition, at least one inflection point may be formed on the first surface of the fourth lens 140. For example, the first surface of the fourth lens 140 may be convex in a paraxial region and become concave toward an edge thereof.

In addition, the stop ST may be disposed between the third lens 130 and the fourth lens 140.

The inflection point may be formed on the surface of the lens disposed close to the stop ST to thus improve correction performance of astigmatism and coma-aberration.

The fifth lens 150 may have negative refractive power, and a first surface thereof may be concave in the paraxial region and a second surface thereof may be convex in the paraxial region.

In addition, at least one inflection point may be formed on the first surface of the fifth lens 150. For example, the first surface of the fifth lens 150 may be concave in a paraxial region and become convex toward an edge thereof.

The sixth lens 160 may have positive refractive power, and a first surface thereof may be concave in the paraxial region and a second surface thereof may be convex in the paraxial region.

An optical axis distance between the fifth lens 150 and the sixth lens 160 may be configured to be relatively short. That is, the fifth and sixth lenses 150, 160 may be disposed along the optical axis relatively close to each other.

The fifth lens 150 and the sixth lens 160 may be formed of plastic having optical characteristics different from each other. For example, the Abbe numbers of the fifth lens 150 and the sixth lens 160 may be different from each other.

The optical axis distance between the fifth lens 150 and the sixth lens 160 formed of the plastic having different optical characteristics may be configured to be relatively short to improve chromatic aberration correction performance.

Meanwhile, respective surfaces of the first to sixth lenses 110 to 160 may have aspherical coefficients as illustrated in Table. 2. For example, all of object-side surfaces and image-side surfaces of the first to sixth lenses 110 to 160 may be aspherical surfaces.

TABLE 2

|   | S1 | S2 | S3 | S4 | S5 | S6 |
|---|---|---|---|---|---|---|
| R | 1.463946731 | −8.646866285 | 959.5448645 | 3.382933555 | 19.42810857 | 2.120926683 |
| K | −0.133989384 | 0.998344246 | 0.297909075 | 0.509997595 | −6.685547374 | 0.87805276 |
| A | 1.09E−24 | 0.028863778 | 0.020509933 | 0.019630518 | 0.055022581 | −0.02306423 |
| B | −4.27E−36 | 7.08E−05 | −0.00300168 | 0.038792531 | −0.287790834 | −1.37E−01 |
| C | 1.00E−47 | −1.24E−03 | 0.007410129 | −0.198724478 | 0.693412766 | 2.50E−01 |
| D | −1.35E−59 | 2.47E−04 | −0.004790544 | 0.435476904 | −1.004707565 | −1.49E−01 |
| E | 1.03E−71 | −2.28E−05 | 0.001506562 | −0.491780491 | 0.693934244 | 4.23E−02 |
| F | −4.13E−84 | 1.05E−06 | −0.000285241 | 0.268401617 | −0.219209737 | −5.89E−03 |
| G | 6.79E−97 | −1.92E−08 | 2.37E−05 | −0.053983113 | 0.026051365 | 3.24E−04 |

|   | S7 | S8 | S9 | S10 | S11 | S12 |
|---|---|---|---|---|---|---|
| R | 5.182858293 | 5.674158832 | −2.264152779 | −13.32304852 | −21.29550925 | −4.210032884 |
| K | 0.999999858 | 4.73488621 | −11.96617843 | −27.08377426 | 97.99999914 | −4.588713472 |
| A | −0.09512504 | −1.05E−19 | −0.166954516 | −0.097017719 | −7.30E−17 | −1.78E−45 |
| B | −0.09512505 | 2.44E−30 | 0.112622988 | 0.035075267 | 5.98E−24 | 2.94E−67 |
| C | 0.050439683 | −3.58E−41 | −0.028457272 | −0.008279172 | −1.98E−31 | −1.33E−89 |
| D | −0.067098204 | 3.27E−52 | 0.002553083 | 0.001145081 | 2.98E−39 | 3.14E−112 |
| E | 0.060515193 | −1.81E−63 | 0.00021226 | −8.67E−05 | −2.07E−47 | −4.00E−135 |
| F | −0.021416941 | 5.54E−75 | −5.37E−05 | 3.28E−06 | 6.58E−56 | 2.59E−158 |
| G | 0.002587362 | −7.14E−87 | 2.60E−06 | −4.84E−08 | −7.79E−65 | −6.67E−182 |

Figure 3:
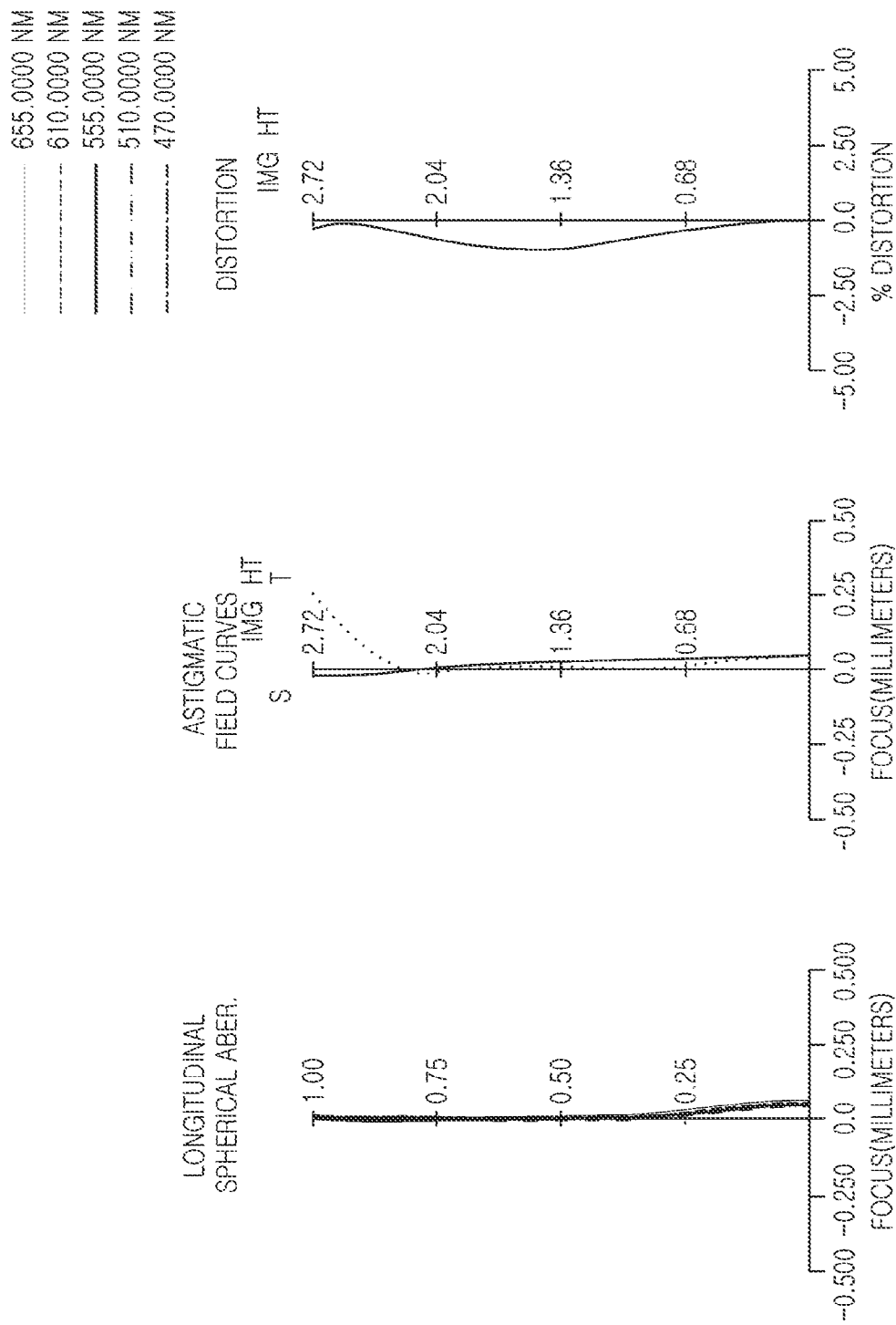
FIG. 3 illustrates curves representing aberration characteristics of the first example of the first optical imaging system illustrated in FIG. 2.

In addition, the first optical imaging system 400a configured as described above may have aberration characteristics illustrated in FIG. 3.

Figure 4:
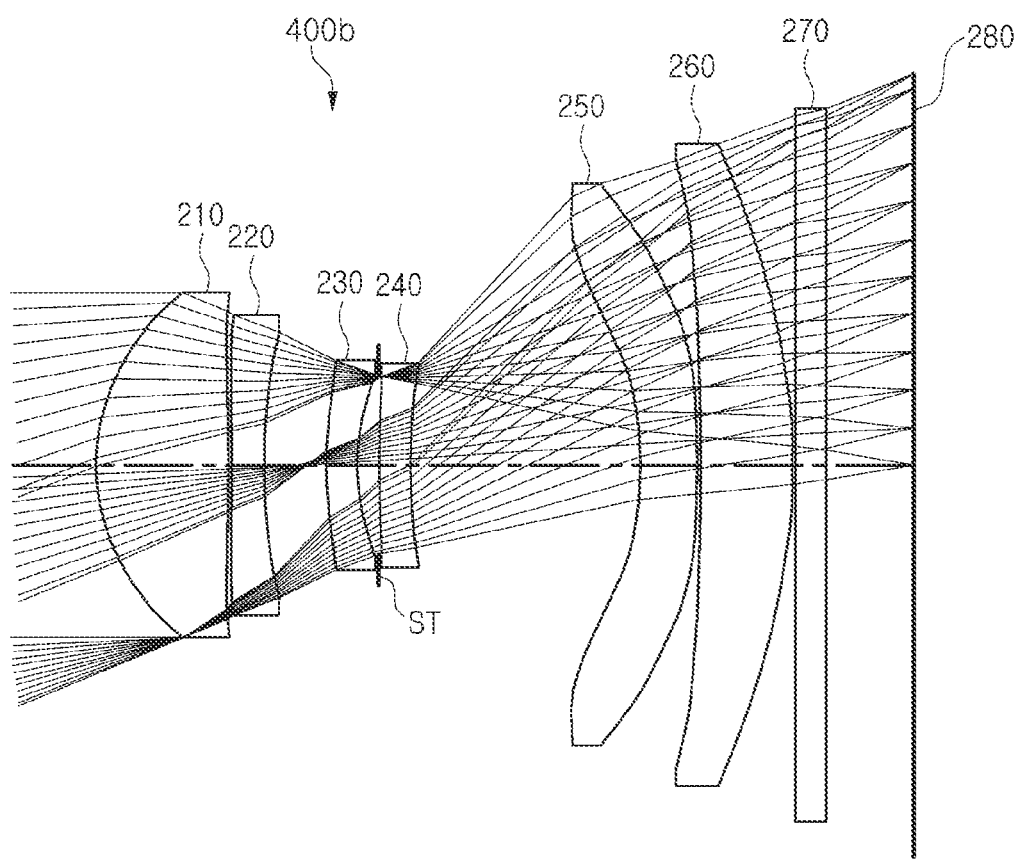
FIG. 4 is a view illustrating a second example of a first optical imaging system.

A second example of the first optical imaging system 400 will be described with reference to FIGS. 4 and 5.

The second example of the first optical imaging system 400b may include an optical system including a first lens 210, a second lens 220, a third lens 230, a fourth lens 240, a fifth lens 250, and a sixth lens 260, and may further include an infrared cut-off filter 270, an image sensor 280, and a stop ST.

Here, lens characteristics (radii of curvature, thicknesses of lenses or distances between the lenses, refractive indices, Abbe numbers, and effective aperture radii) of each lens are represented in Table 3.

TABLE 3

| Example 2 | Radius of Curvature | Thickness or Distance | Refractive Index | Abbe Number | Effective Aperture Radius | Focal Length |
|---|---|---|---|---|---|---|
| S1 | 1.450324672 | 0.936653477 | 1.536 | 55.650 | 1.200 | 2.458986 |
| S2 | −11.2040274 | 0.027023495 |  |  | 1.073 |  |
| S3 | −16.33022207 | 0.22 | 1.667 | 20.353 | 1.046 | −4.98814 |

TABLE 3-continued

| Example 2 | Radius of Curvature | Thickness or Distance | Refractive Index | Abbe Number | Effective Aperture Radius | Focal Length |
|---|---|---|---|---|---|---|
| S4 | 4.200315913 | 0.437131956 | | | 0.924 | |
| S5 | 2.075211629 | 0.22 | 1.536 | 55.650 | 0.730 | −6.26754 |
| S6 | 1.235379194 | 0.15 | | | 0.637 | |
| S7 | 4.957874783 | 0.22 | 1.667 | 20.353 | 0.623 | −34.5267 |
| S8 | 4.007088066 | 1.617148606 | | | 0.713 | |
| S9 | −2.426080348 | 0.4 | 1.536 | 55.650 | 1.867 | −5.20057 |
| S10 | −19.77431236 | 0.025 | | | 1.957 | |
| S11 | −21.28181615 | 0.642042465 | 1.667 | 20.353 | 2.109 | 8.214169 |
| S12 | −4.409332441 | 0.025 | | | 2.229 | |
| S13 | Infinity | 2.10E−01 | 1.518 | 64.197 | 2.432 | |
| S14 | Infinity | 6.39E−01 | | | 2.482 | |
| Image | Infinity | −1.89E−02 | | | 2.725 | |

Meanwhile, an overall focal length F of the second example of the first optical imaging system 400b is 6.9262 mm, a focal length f1 of the first lens 210 is 2.458986 mm, a focal length f2 of the second lens 220 is −4.98814 mm, a focal length f3 of the third lens 230 is −6.26754 mm, a focal length f4 of the fourth lens 240 is −34.5267 mm, a focal length f5 of the fifth lens 250 is −5.20057 mm, and a focal length f6 of the sixth lens 260 is 8.214169 mm.

In addition, a field of view (FOV) of the second example of the first optical imaging system 400b is 43.7°.

In the second example, the first lens 210 may have positive refractive power, and a first surface and a second surface thereof may be convex in the paraxial region.

The second lens 220 may have negative refractive power, and a first surface and a second surface thereof may be concave in the paraxial region.

An optical axis distance between the first lens 210 and the second lens 220 may be configured to be relatively short. That is, the first and second lenses 210, 220 may be disposed along the optical axis relatively close to each other.

The first lens 210 and the second lens 220 may be formed of plastic having optical characteristics different from each other. For example, the Abbe numbers of the first lens 210 and the second lens 220 may be different from each other.

The optical axis distance between the first lens 210 and the second lens 220 formed of the plastic having different optical characteristics may be configured to be relatively short to improve chromatic aberration correction performance.

The third lens 230 may have negative refractive power, and a first surface thereof may be convex in the paraxial region and a second surface thereof may be concave in the paraxial region.

The fourth lens 240 may have negative refractive power, and a first surface thereof may be convex in the paraxial region and a second surface thereof may be concave in the paraxial region.

An optical axis distance between the third lens 230 and the fourth lens 240 may be configured to be relatively short. That is, the third and fourth lenses 230, 240 may be disposed along the optical axis relatively close to each other.

The third lens 230 and the fourth lens 240 may be formed of plastic having optical characteristics different from each other. For example, the Abbe numbers of the third lens 230 and the fourth lens 240 may be different from each other.

The optical axis distance between the third lens 230 and the fourth lens 240 formed of the plastic having different optical characteristics may be configured to be relatively short to improve chromatic aberration correction performance.

In addition, at least one inflection point may be formed on the first surface of the fourth lens 240. For example, the first surface of the fourth lens 240 may be convex in a paraxial region and become concave toward an edge thereof.

In addition, the stop ST may be disposed between the third lens 230 and the fourth lens 240.

The inflection point may be formed on the surface of the lens disposed close to the stop ST to improve correction performance of astigmatism and coma-aberration.

The fifth lens 250 may have negative refractive power, and a first surface thereof may be concave in the paraxial region and a second surface thereof may be convex in the paraxial region.

In addition, at least one inflection point may be formed on the first surface of the fifth lens 250. For example, the first surface of the fifth lens 250 may be concave in a paraxial region and become convex toward an edge thereof.

The sixth lens 260 may have positive refractive power, and a first surface thereof may be concave in the paraxial region and a second surface thereof may be convex in the paraxial region.

An optical axis distance between the fifth lens 250 and the sixth lens 260 may be configured to be relatively short. That is, the fifth and sixth lenses 250, 260 may be disposed along the optical axis relatively close to each other.

The fifth lens 250 and the sixth lens 260 may be formed of plastic having optical characteristics different from each other. For example, the Abbe numbers of the fifth lens 250 and the sixth lens 260 may be different from each other.

The optical axis distance between the fifth lens 250 and the sixth lens 260 formed of the plastic having different optical characteristics may be configured to be relatively short to improve chromatic aberration correction performance.

Meanwhile, respective surfaces of the first to sixth lenses 210 to 260 may have aspherical coefficients as illustrated in Table. 4. For example, all of object-side surfaces and image-side surfaces of the first to sixth lenses 210 to 260 may be aspherical surfaces.

TABLE 4

| | S1 | S2 | S3 | S4 | S5 | S6 |
|---|---|---|---|---|---|---|
| R | 1.450824672 | −11.2040274 | −16.33022207 | 4.200315913 | 2.075211629 | 1.235379194 |
| K | −0.108999286 | 0.998803548 | 0.473432126 | −0.139419309 | −6.77068665 | 0.138963086 |
| A | 1.09E−24 | 0.037239208 | 0.024067335 | −0.027840984 | −0.225509683 | −0.44649055 |
| B | −4.27E−36 | 5.04E−05 | 0.027295735 | 0.090583232 | 0.218639087 | 0.306701589 |

TABLE 4-continued

| | | | | | |
|---|---|---|---|---|---|
| C | 1.00E−47 | −1.97E−03 | −0.019630308 | −0.158336648 | 0.085773811 | 0.025122083 |
| D | −1.35E−59 | 4.29E−04 | 0.00519754 | 0.2541712 | −0.452361137 | −0.098661713 |
| E | 1.03E−71 | −4.23E−05 | −0.000306514 | −0.267349847 | 0.369830363 | 0.040930784 |
| F | −4.13E−84 | 2.03E−06 | −0.000158039 | 0.136893052 | −0.121185635 | −0.00708053 |
| G | 6.79E−97 | −3.86E−08 | 2.52E−05 | −0.025106993 | 0.014485107 | 0.000462094 |

| | S7 | S8 | S9 | S10 | S11 | S12 |
|---|---|---|---|---|---|---|
| R | 4.957874783 | 4.007083066 | −2.426080348 | −19.77431236 | −21.28181615 | −4.409332441 |
| K | 0.999999924 | 4.703740249 | −21.30984089 | −27.08259006 | 97.75024463 | −2.410568354 |
| A | −0.118452535 | −1.05E−19 | −0.246764617 | −0.133021884 | −7.30E−17 | −1.78E−45 |
| B | −0.147871334 | 2.44E−30 | 0.178313737 | 0.05325333 | 5.98E−24 | 2.94E−67 |
| C | 0.316026392 | −3.58E−41 | −0.059061686 | −0.012231444 | −1.98E−31 | −1.33E−89 |
| D | −0.327676633 | 3.27E−52 | 0.011361076 | 0.001589243 | 2.98E−39 | 3.14E−112 |
| E | 0.169384845 | −1.81E−63 | −0.00127409 | −1.11E−04 | −2.07E−47 | −4.00E−135 |
| F | −0.041821082 | 5.54E−75 | 7.68E−05 | 3.90E−06 | 6.58E−56 | 2.59E−158 |
| G | 0.003941456 | −7.14E−87 | −1.93E−06 | −5.34E−08 | −7.79E−65 | −6.67E−182 |

Figure 5:
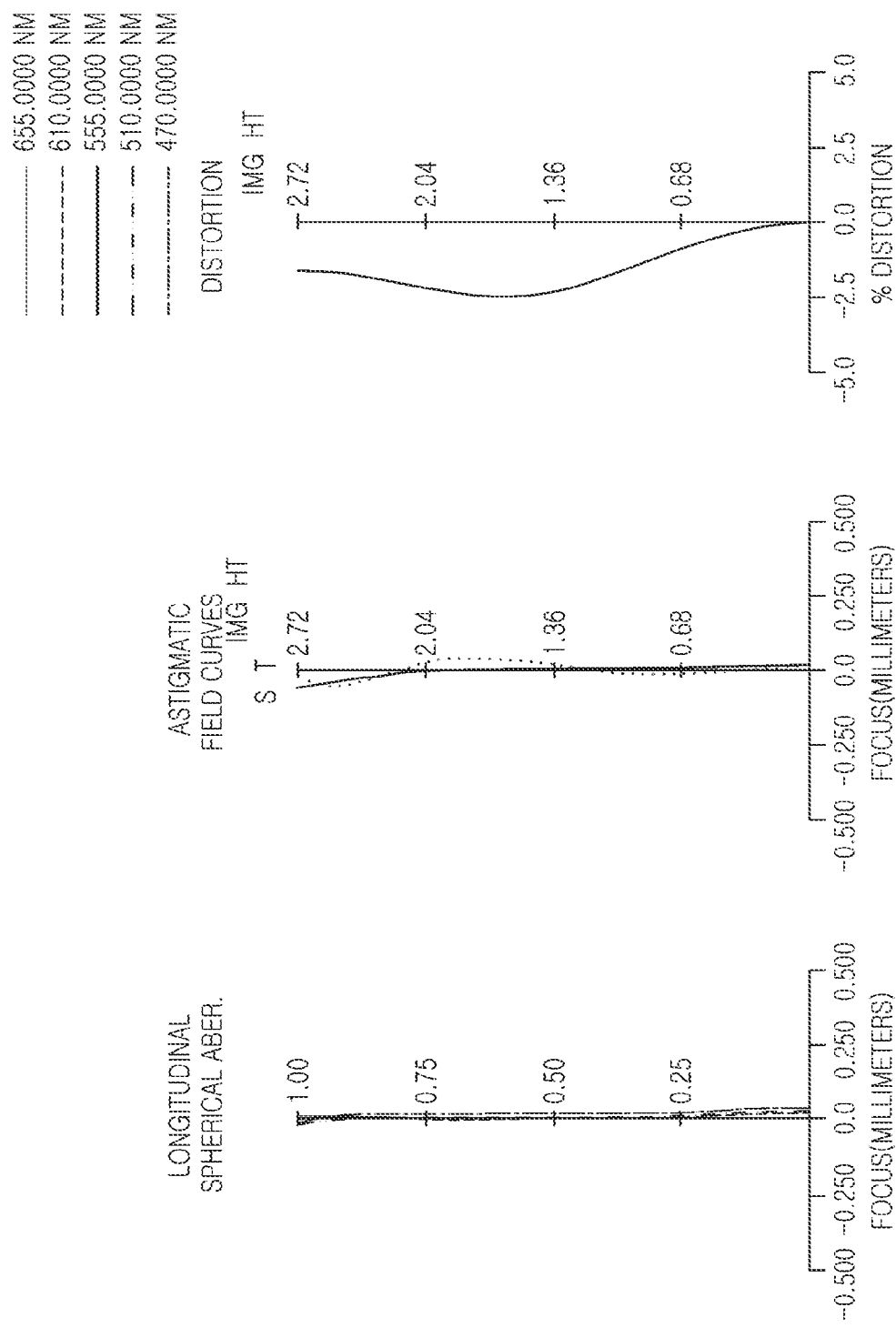
FIG. 5 illustrates curves representing aberration characteristics of the second example of the first optical imaging system illustrated in FIG. 4.

In addition, the second example of the first optical imaging system 400b configured as described above may have aberration characteristics illustrated in FIG. 5.

Figure 6:
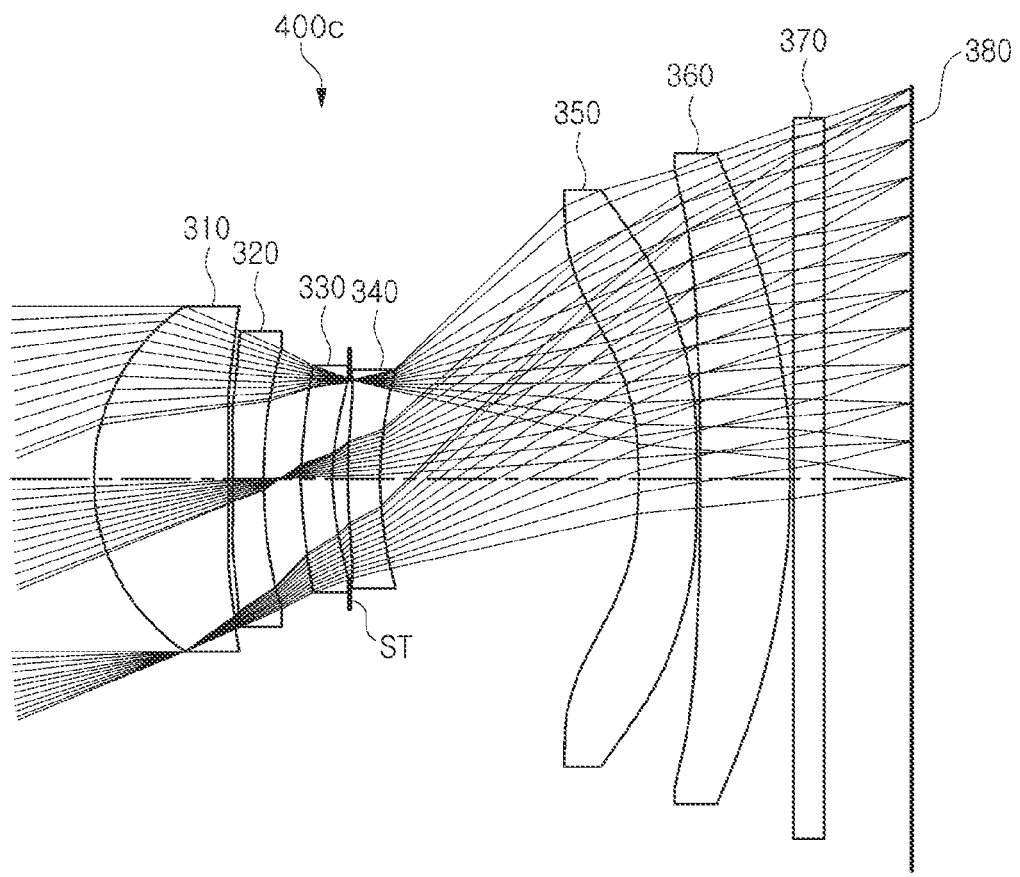
FIG. 6 is a view illustrating a third example of a first optical imaging system in the examples described herein.

A third example of the first optical imaging system 400 will be described with reference to FIGS. 6 and 7.

The third example of the first optical imaging system 400c may include an optical system including a first lens 310, a second lens 320, a third lens 330, a fourth lens 340, a fifth lens 350, and a sixth lens 360, and may further include an infrared cut-off filter 370, an image sensor 380, and a stop ST.

Here, lens characteristics (radii of curvature, thicknesses of lenses or distances between the lenses, refractive indices, Abbe numbers, and effective aperture radii) of each lens are represented in Table 5.

TABLE 5

| Example 3 | Radius of Curvature | Thickness or Distance | Refractive Index | Abbe Number | Effective Aperture Radius | Focal Length |
|---|---|---|---|---|---|---|
| S1 | 1.427592975 | 0.947667138 | 1.536 | 55.650 | 1.200 | 2.616186 |
| S2 | −61.10520147 | 0.025 | | | 1.049 | |
| S3 | 78.59688111 | 0.22 | 1.667 | 20.353 | 1.026 | −5.39922 |
| S4 | 3.439272796 | 0.259592486 | | | 0.902 | |
| S5 | 2.166641666 | 0.22 | 1.536 | 55.650 | 0.791 | −7.62391 |
| S6 | 1.365789842 | 0.113236642 | | | 0.699 | |
| S7 | 3.138329321 | 0.22 | 1.667 | 20.353 | 0.686 | −43.1324 |
| S8 | 2.750259986 | 1.830059953 | | | 0.760 | |
| S9 | −2.444344097 | 0.4 | 1.536 | 55.650 | 1.892 | −5.16861 |
| S10 | −21.93963443 | 0.030039535 | | | 2.007 | |
| S11 | −21.36820118 | 0.629404245 | 1.667 | 20.353 | 2.143 | 9.398628 |
| S12 | −4.90361342 | 0.025 | | | 2.261 | |
| S13 | Infinity | 0.21 | 1.518 | 64.197 | 2.454 | |
| S14 | Infinity | 0.65661826 | | | 2.502 | |
| Image | Infinity | −0.036138976 | | | 2.726 | |

Meanwhile, an overall focal length F of the third example of the first optical imaging system 400c is 6.927 mm, a focal length f1 of the first lens 310 is 2.616186 mm, a focal length f2 of the second lens 320 is −5.39922 mm, a focal length f3 of the third lens 330 is −7.62391 mm, a focal length f4 of the fourth lens 340 is −43.1324 mm, a focal length f5 of the fifth lens 350 is −5.16861 mm, and a focal length f6 of the sixth lens 360 is 9.398628 mm.

In addition, in the third example, a field of view (FOV) of the first optical imaging system 400c is 43.77°.

In the third example, the first lens 310 may have positive refractive power, and a first surface and a second surface thereof may be convex in the paraxial region.

The second lens 320 may have negative refractive power, and a first surface thereof may be convex in the paraxial region and a second surface thereof may be concave in the paraxial region.

An optical axis distance between the first lens 310 and the second lens 320 may be configured to be relatively short. That is, the first and second lenses 310, 320 may be disposed along the optical axis relatively close to each other.

The first lens 310 and the second lens 320 may be formed of plastic having optical characteristics different from each other. For example, the Abbe numbers of the first lens 310 and the second lens 320 may be different from each other.

The optical axis distance between the first lens 310 and the second lens 320 each formed of plastic having different optical characteristics may be configured so that the first lens 310 and the second lens 320 are relatively close to each other to improve chromatic aberration correction performance.

The third lens 330 may have negative refractive power, and a first surface thereof may be convex in the paraxial region and a second surface thereof may be concave in the paraxial region.

The fourth lens 340 may have positive refractive power, and a first surface thereof may be convex in the paraxial region and a second surface thereof may be concave in the paraxial region.

An optical axis distance between the third lens 330 and the fourth lens 340 may be configured to be relatively short. That is, the third and fourth lenses 330, 340 may be disposed along the optical axis relatively close to each other.

The third lens 330 and the fourth lens 340 may be formed of plastic having optical characteristics different from each other. For example, the Abbe numbers of the third lens 330 and the fourth lens 340 may be different from each other.

The optical axis distance between the third lens 330 and the fourth lens 340 each formed of plastic having different optical characteristics may be configured so that the third lens 330 and the fourth lens 340 are relatively close to each other to improve chromatic aberration correction performance.

In addition, at least one inflection point may be formed on the first surface of the fourth lens 340. For example, the first surface of the fourth lens 340 may be convex in a paraxial region and become concave toward an edge thereof.

In addition, the stop ST may be disposed between the third lens 330 and the fourth lens 340.

The inflection point may be formed on the surface of the lens disposed close to the stop ST to improve correction performance of astigmatism and coma-aberration.

The fifth lens 350 may have negative refractive power, and a first surface thereof may be concave in the paraxial region and a second surface thereof may be convex in the paraxial region.

In addition, at least one inflection point may be formed on the first surface of the fifth lens 350. For example, the first surface of the fifth lens 350 may be concave in the paraxial region and become convex toward an edge thereof.

The sixth lens 360 may have positive refractive power, and a first surface thereof may be concave in the paraxial region and a second surface thereof may be convex in the paraxial region.

An optical axis distance between the fifth lens 350 and the sixth lens 360 may be configured to be relatively short. That is, the fifth and sixth lenses 350, 360 may be disposed along the optical axis relatively close to each other.

The fifth lens 350 and the sixth lens 360 may be formed of plastic having optical characteristics different from each other. For example, the Abbe numbers of the fifth lens 350 and the sixth lens 360 may be different from each other.

The optical axis distance between the fifth lens 350 and the sixth lens 360 each formed of plastic having different optical characteristics may be configured so that the fifth lens 350 and the sixth lens 360 are relatively close to each other to improve chromatic aberration correction performance.

Meanwhile, respective surfaces of the first to sixth lenses 310 to 360 may have aspherical coefficients as illustrated in Table. 6. For example, all of object-side surfaces and image-side surfaces of the first to sixth lenses 310 to 360 may be aspherical surfaces.

Figure 7:
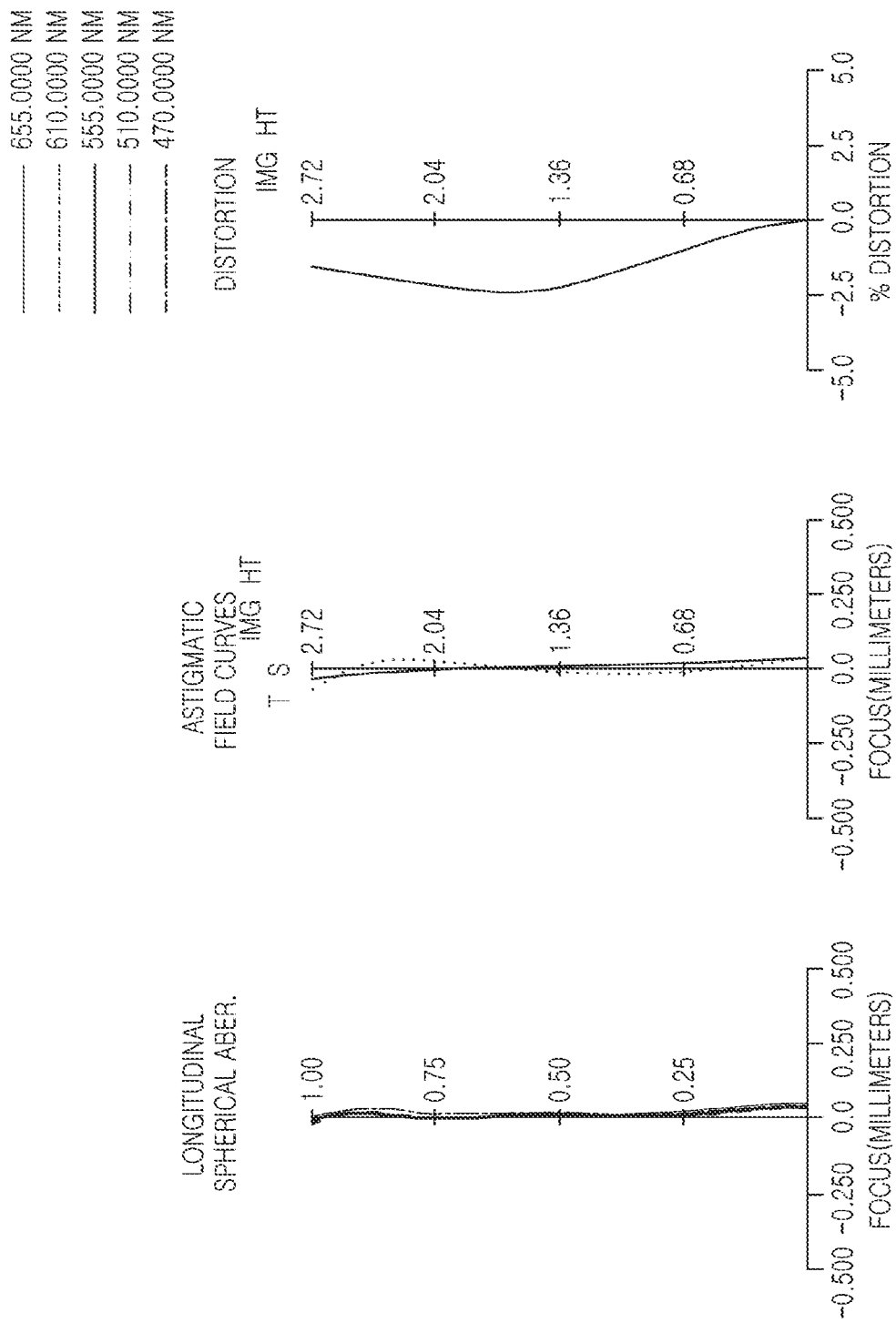
FIG. 7 illustrates curves representing aberration characteristics of the third example of the first optical imaging system illustrated in FIG. 6.

In addition, the third example of the first optical imaging system 400c configured as described above may have aberration characteristics illustrated in FIG. 7.

Table 7 summarizes some of the optical characteristics of the first example of the first optical imaging system 400a, the second example of the first optical imaging system 400b, and the third example of the first optical imaging system 400c described above.

TABLE 7

|  | Example 1 | Example 2 | Example 3 |
|---|---|---|---|
| TTL | 5.75 | 5.7497 | 5.75 |
| F | 6.927 | 6.9262 | 6.927 |
| FOV | 43.43 | 43.696 | 43.7667 |
| TTL/F | 0.830 | 0.830 | 0.830 |
| D23/D34 | 5.388 | 2.914 | 2.292 |
| f1/F | 0.349 | 0.355 | 0.378 |

In the examples described herein, the optical imaging system which readily performs an aberration correction and has a narrow field of view may be easily applied to a portable electronic device.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

TABLE 6

|  | S1 | S2 | S3 | S4 | S5 | S6 |
|---|---|---|---|---|---|---|
| R | 1.427592975 | −61.10520147 | 78.59688111 | 3.439272796 | 2.166641666 | 1.365789842 |
| K | −0.047546604 | 0.999473319 | 0.473358657 | −0.093875344 | −5.48212518 | 0.079998285 |
| A | 1.09E−24 | 0.042668746 | 0.02395669 | −0.041645551 | −0.241683076 | −0.505530899 |
| B | −4.27E−36 | 4.67E−03 | 0.030560199 | 0.154967881 | 0.248415228 | 0.369625906 |
| C | 1.00E−47 | −4.32E−03 | 0.002098445 | −0.327888285 | 0.27714106 | −0.016926512 |
| D | −1.35E−59 | 8.92E−04 | −0.019122208 | 0.715450736 | −0.804521888 | −0.081095321 |
| E | 1.03E−71 | −8.81E−05 | 0.00977612 | −0.877981674 | 0.606501119 | 0.036390072 |
| F | −4.13E−84 | 4.31E−06 | −0.002052284 | 0.486435606 | −0.192494979 | −0.006425488 |
| G | 6.79E−97 | −8.33E−08 | 1.61E−04 | −0.096621787 | 0.022583034 | 0.000422322 |

|  | S7 | S8 | S9 | S10 | S11 | S12 |
|---|---|---|---|---|---|---|
| R | 3.138329321 | 2.750259986 | −2.444344097 | −21.93963443 | −21.36820118 | −4.90361342 |
| K | 1 | 3.233332688 | −22.60105043 | −27.08259006 | 95.75590308 | −1.256217694 |
| A | −0.186840269 | −1.05E−19 | −0.238409484 | −0.122004598 | −7.30E−17 | −1.78E−45 |
| B | −0.143659011 | 2.44E−30 | 0.160415986 | 0.047044938 | 5.98E−24 | 2.94E−67 |
| C | 0.338475555 | −3.58E−41 | −0.051848079 | −0.009867783 | −1.98E−31 | −1.33E−89 |
| D | −0.372713191 | 3.27E−52 | 0.010294009 | 0.001102409 | 2.98E−39 | 3.14E−112 |
| E | 0.207680172 | −1.81E−63 | −0.001247111 | −6.58E−05 | −2.07E−47 | −4.00E−135 |
| F | −0.055388846 | 5.54E−75 | 8.30E−05 | 1.98E−06 | 6.58E−56 | 2.59E−158 |
| G | 0.005629237 | −7.14E−87 | −2.30E−06 | −2.36E−08 | −7.79E−65 | −6.67E−182 |

What is claimed is:

1. An optical imaging system comprising:
a first lens having positive refractive power, a convex object-side surface and a convex image-side surface;
a second lens having negative refractive power, a convex object-side surface in a paraxial region, and a concave image-side surface;
a third lens having negative refractive power, a convex object-side surface and a concave image-side surface;
a fourth lens having negative refractive power, a convex object-side surface and a concave image-side surface;
a fifth lens having negative refractive power; and
a sixth lens having positive refractive power, and a convex image-side surface in a paraxial region,
wherein the first to sixth lenses are sequentially disposed on an optical axis from an object side toward an image side,
wherein among the first to sixth lenses, the fourth lens has the largest absolute focal length value, and
wherein a field of view of the optical system including the first to sixth lenses is FOV and FOV≤44°.

2. The optical imaging system of claim 1, wherein among the first to sixth lenses, the first lens has the smallest absolute focal length value.

3. The optical imaging system of claim 1, wherein the first lens and the second lens are formed of plastic having different optical characteristics.

4. The optical imaging system of claim 1, wherein the third lens and the fourth lens are formed of plastic having different optical characteristics.

5. The optical imaging system of claim 1, wherein the fifth lens and the sixth lens are formed of plastic having different optical characteristics.

6. The optical imaging system of claim 1, wherein each of the first to sixth lenses is formed of plastic having optical characteristics different from those of adjacent lenses.

7. An optical imaging system comprising:
a first lens having positive refractive power, a convex object-side surface and a convex image-side surface;
a second lens having negative refractive power, a convex object-side surface in a paraxial region, and a concave image-side surface;
a third lens having negative refractive power, a convex object-side surface and a concave image-side surface;
a fourth lens having negative refractive power, a convex object-side surface and a concave image-side surface;
a fifth lens having negative refractive power; and
a sixth lens having positive refractive power, and a convex image-side surface in a paraxial region,
wherein the first to sixth lenses are sequentially disposed on an optical axis from an object side toward an image side, and
wherein among the first to sixth lenses, the fourth lens has the largest absolute focal length value.

8. The optical imaging system of claim 7, wherein among the first to sixth lenses, the first lens has the smallest absolute focal length value.

9. The optical imaging system of claim 7, wherein the first lens and the second lens are formed of plastic having different optical characteristics.

10. The optical imaging system of claim 7, wherein the third lens and the fourth lens are formed of plastic having different optical characteristics.

11. The optical imaging system of claim 7, wherein the fifth lens and the sixth lens are formed of plastic having different optical characteristics.

12. The optical imaging system of claim 7, wherein each of the first to sixth lenses is formed of plastic having optical characteristics different from those of adjacent lenses.

* * * * *